Jan. 21, 1969   J. F. REUS   3,422,699
ANTIBACKUP DEVICE
Filed April 11, 1967   Sheet 1 of 2
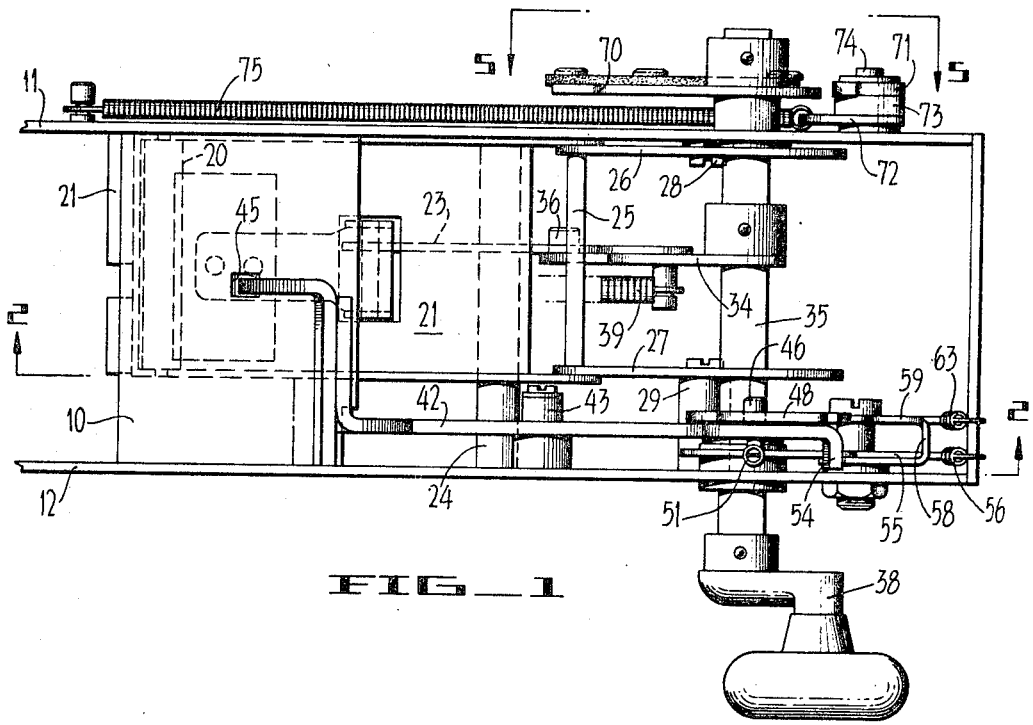
FIG_1
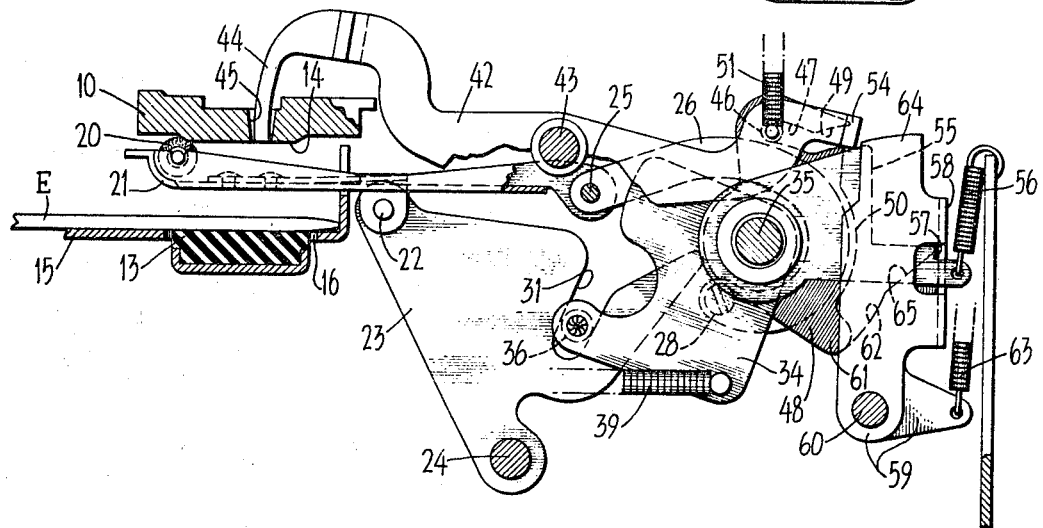
FIG_2
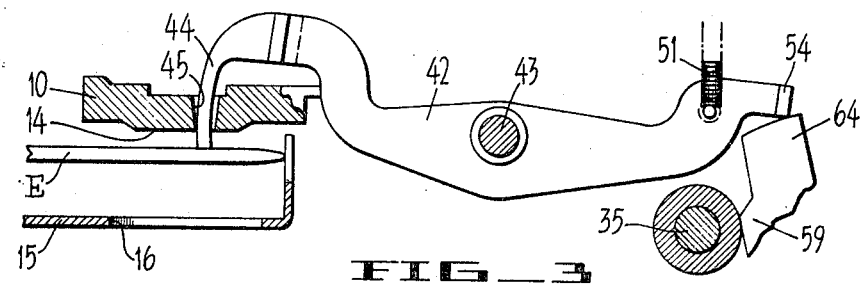
FIG_3

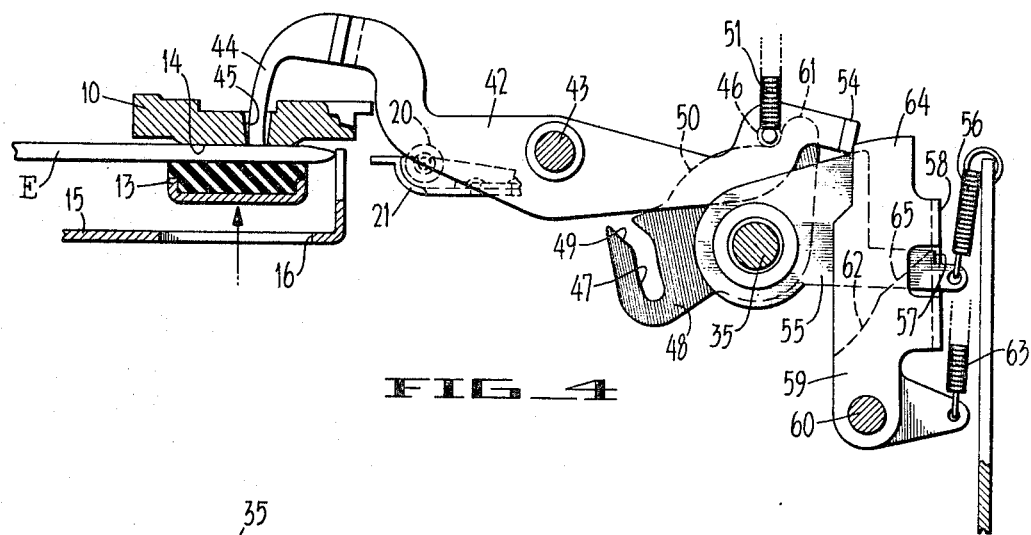
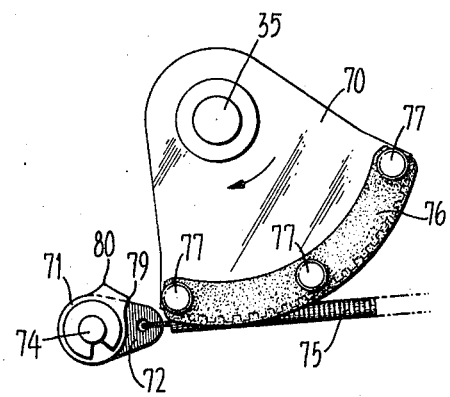
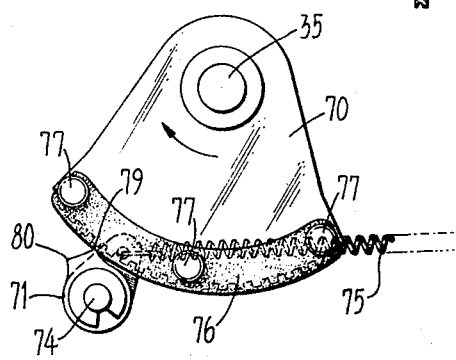
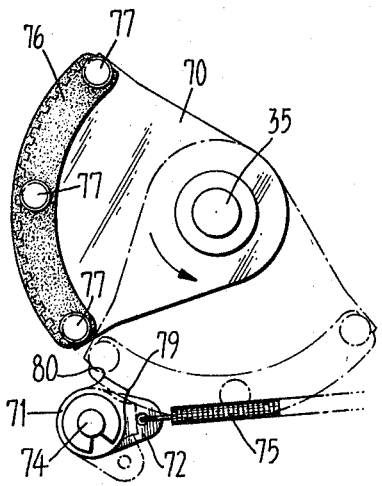
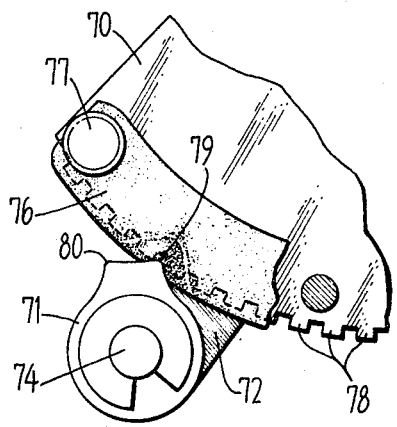

United States Patent Office 3,422,699
Patented Jan. 21, 1969

3,422,699
ANTIBACKUP DEVICE
John F. Reus, Hayward, Calif., assignor to Friden, Inc.,
a corporation of Delaware
Filed Apr. 11, 1967, Ser. No. 630,036
U.S. Cl. 74—534        5 Claims
Int. Cl. G05g 5/06; F16d 61/00

ABSTRACT OF THE DISCLOSURE

Apparatus for eliminating the noise coincident with the passage of the pawl over the teeth of a gear in a pawl and ratchet gearing mechanism. An arcuate strip of a soft elastomeric material, having a radius greater than that of the gear, is secured to the gear, concentric therewith, to provide a surface on which the pawl rests during rotation of the gear in one direction. Upon attempted reversal of gear rotation, the elastomeric material yields to enable the pawl to engage between adjacent gear teeth.

---

This invention relates to postage printing machines and more particularly to the manually operated drive mechanism therefor.

In the machine disclosed, the printing unit is preferably of the reciprocating type, wherein the hand crank is rocked a predetermined angular extent in one direction to effect printing. During this movement of the crank a toothed sector is likewise rocked and a pawl associated therewith becomes effective to prevent return of the crank to its normally inactive position until the extent of movement of the crank is reached. At this time, the sector is out of engagement with the pawl and the crank and pawl are free to return to their inactive position. During the return of the crank, the pawl again becomes effective to prevent a reversal of movement of the crank in a direction other than that of its return movement to inactive position. As the toothed sector is rocked in either direction, the spring biased pawl rides on the peripheral surface of a segment or arcuate strip of a soft elastomeric material, the outside radius of which is greater than the outside radius of the toothed sector. Thus, there is no ratcheting noise coincident with the rocking of the sector. As the crank is rocked in either direction a reversal of such movement prior to reaching an extreme position is prevented by the pawl causing the soft elastomeric material to yield thereby enabling the pawl to engage between adjacent teeth of the sector.

Various types of ratchet gearing and cooperating pawls, for preventing the reversal of rotation of a gear or movement of a rack, are very well known. In the use of each of the various types, motion is permitted in one direction while the pawl, which is resiliently maintained in engagement with the teeth of the gear or rack, passes over the teeth causing a click or clinking sound. Such a noise is highly undesirable in a confined area or office where there may be a number of different types of business machines in which there is ratchet gearing in one form or another.

It is an object of the invention, therefore, to provide an improved ratchet gear and pawl mechanism which is substantially noiseless.

It is a further object of the invention to provide an improved ratchet gear and pawl means for a drive mechanism whereby a spring biased pawl is normally disengaged from the ratchet teeth to enable motion in one direction and immediately engageable therewith to prevent motion in the opposite direction.

Other objects and advantages will be apparent from the following description of a preferred embodiment of the invention as illustrated in the accompanying drawings in which:

FIG. 1 is a fragmentary plan view of a postage printing device showing the reciprocating drive mechanism;

FIG. 2 is a sectional elevational view taken on the planes indicated by lines 2—2 of FIG. 1;

FIG. 3 is a fragmentary elevational view showing the obstruction member for preventing the movement of an envelope against the printing guide;

FIG. 4 is a fragmentary sectional elevational view showing the printing of the indicia on an envelope;

FIG. 5 is an elevational view of the ratchet gear and pawl with the gear sector in the normally inactive position of the drive mechanism, the view being taken on the plane indicated by line 5—5 in FIG. 1;

FIG. 6 is a view of the ratchet gear and pawl during a printing operation;

FIG. 7 is a view showing the gear sector in the fully actuated position of the drive mechanism; and FIG. 8 is an enlarged detail showing the pawl actively positioned to prevent counterclockwise movement of the gear sector.

The invention is shown as being embodied in a postage printing device, having a printing die plate 10 fixed between the frame members 11 and 12. The platen 13 is adapted to be raised to a printing position with relation to the indicium die face 14, in a well known manner, as disclosed in Patent No. 2,344,609, issued to W. J. Hanson, Mar. 21, 1944. The letter support plate 15 is suitably supported in the frame structure and has an opening 16 therein through which the platen 13 is adapted to pass during a printing cycle of operation when moving the envelope E to printing position.

Ink for the indicium die face 14 is provided by the inking roller 20 which is suitably supported in the tray 21 and is normally "at rest" in the position shown in FIG. 2, wherein the roller 20 is in engagement with the forward edge of the indicium die face. Intermediate its ends, the tray 21 is pivotally supported at 22 on the upper end of the lever 23, which is pivotally supported at its lower end on the shaft 24 secured at its respective ends in frame members 11 and 12. Each of the parallel side walls of the ink roller supporting tray 21 is pivotally secured at its right end (FIG. 2) on the respective ends of the shaft 25 (FIGS. 1 and 2) which is carried by the extended end of each of a pair of similar arcuately formed links 26 and 27. At its other end, each of the parallel links 26 and 27 is pivotally supported on respective studs 28 and 29 secured on frame members 11 and 12, respectively.

During each printing cycle of operation, the inking roller 20 is moved from the position shown in FIG. 2 in a horizontal plane across the indicium die face 14 to the position shown in FIG. 4 and return with the rocking of the lever 23. For this purpose, the lever 34 is pinned to drive shaft 35 and has the roller 36 secured thereon engaging in the slot 37 of the lever 23. At its outer end, the shaft 35 carries crank 38 pinned thereon and the movement of the crank to the left in FIG. 1, for the printing phase of each cycle of machine operation, rocks lever 34 (FIG. 2) counterclockwise against the urgency of a relatively strong spring 39, thereby rocking lever 23 in a clockwise direction to move the ink roller 20 in a horizontal direction across the face 14 of the printing die. Immediately thereafter, the crank 38 is restored to its normally inactive position, with the aid of the influence of spring 39.

In the normally inactive position, i.e., the "at rest" position of the parts, as seen in FIG. 2, the ink roller support tray 21 serves to prevent the taking of a fraudulent impression. As the ink roller support tray 21 is moved to the right (FIG. 2) to a point short of its full extent of movement, but where the indicium die face 14 would normally be exposed, the taking of a fraudulent impression would normally be possible. However, at this time a second means becomes effective to prevent the taking of such an impression.

For this purpose, the rocker arm 42 is pivotally supported intermediate its ends on the stud 43 secured on frame member 12. The laterally offset end of the rocker arm 42 is provided with a dependent extension 44, the lower end portion of which is normally disposed within a suitable aperture 45 in the print die plate 10. Adjacent its other end, the rocker arm 42 carries the pin 46, a portion of which extends through the rocker arm and serves to support one end of the spring 51, which normally urges the rocker arm in a counterclockwise direction (FIG. 2) to move the end extension 44 downwardly through the aperture 45. Normally, pin 46 is engaged in the arcuate portion of the cam slot 47 in cam arm 48 secured on drive shaft 35. During the initial counterclockwise rocking movement of the cam arm 48, the pin 46 remains stationary and, thereafter, engages the angular open-end portion 49 of the cam slot 47 to rock rocker arm 42 counterclockwise so that the lower end portion of the extension 44 thereof projects below the indicium die face 14. Such movement of the rocker arm 42 occurs immediately after the end of the ink roller support tray 21 moves beyond the aperture 45 in the die plate 10. Upon continued movement of the cam arm 48 and the disengagement of the cam slot 47 therein with the pin 46, rocker arm 42 is free to be rocked in a clockwise direction by the movement of the platen 13 upwardly to effect the taking of a postmark impression. During this portion of the printing phase of operation, the pin 46 on rocker arm 42 rides on the dwell surface 50 of the cam arm 48 as seen in FIG. 4.

When the machine is in its normally inactive or "at rest" position, the laterally formed ear 54 on the rightmost end of rocker arm 42 overlies the upper edge of the latch arm 55 pivotally supported on shaft 35. By virtue of the engagement of the pin 46 on rocker arm 42 with the cam slot 47 in cam arm 48, the latch arm 55 is rocked clockwise sufficiently, against the urgency of spring 56, to maintain shoulder 57 out of engagement with the inner surface of the wall 58 of latch member 59 rockably mounted on stud 60 secured on frame member 12. Also, at this time, the round nose portion 61 of the cam arm 48 is in engagement with the arcuate cam surface 62 of latch member 59 to maintain latching member 59 in the inactive position shown in FIG. 2 against the urgency of the spring 63.

As the crank 38 is moved to the left (FIG. 1) for a printing operation, the cam arm 48 is rocked counterclockwise. At the instant the pin 46 on rocker arm 42 is moved upwardly into the angular open-end portion 49 of the slot 47, latch arm 55 rocks counterclockwise, under the urgency of spring 56, sufficiently for the shoulder 57 to move into position for engagement by the inner face of the wall 58 of latch member 59. Immediately following the release of latch arm 55 to the influence of spring 56, the round nose portion 61 of cam arm 48 is moved out of engagement with the arcuate surface 62 on latch member 59, thereby releasing latch member 59 to the influence of its spring 63. However, latch member 59 is maintained substantially in the position shown in FIG. 2 by the engagement of the inner surface of the wall 58 thereof with the shoulder 57 on latch arm 55. As the envelope E is moved upwardly by platen 13 into contact with the indicium die face 14, the rocker arm 42 is rocked clockwise (FIG. 4) so that the ear 54 of the arm 42 engages the upper edge of the latch arm 55, rocking it clockwise sufficiently to release the shoulder 57 thereon from its engagement with the wall 58 of the latch member 59. Thus, latch member 59 is released to the influence of its spring 63 and rocks to a position wherein the leading edge of the upwardly extended end portion 64 of the latch member 59 engages the ear 54 on rocker arm 42, as seen in FIG. 4.

As the crank 38 begins its return to its normally inactive position and the platen 13 is dropped to its inactive position, the spring 51 becomes effective to rock rocker arm 42 counterclockwise the limit of its movement. At this time, spring 63 also becomes effective to rock latch member 59 counterclockwise against the bearing journal of the drive shaft 35 (FIG. 3). In this position of the latch member 59, the top edge of the upwardly extended portion 64 of the latch member is in a position to be engaged by the ear 54 of rocker arm 42 (FIG. 3) to prevent complete return movement of the rocker arm 42 to its "at rest" position, until the cycle of operation is completed. As the crank 38 continues in its restoration movement to the inactive position, the round nose portion 61 of the cam arm 48 engages the inclined surface 65 of latch member 59 to restore the latch member to the inactive position shown in FIG. 2, whereupon the cam slot 47 of the cam arm 48 reengages pin 46 on rocker arm 42, thereby restoring the rocker arm to its inactive position.

Means are provided for ensuring a full stroke, both in the operation of crank 38 to control the printing phase of the cycle of machine operation and the return of the crank 38 to its inactive position shown in FIG. 1. For this purpose, a ratchet gear sector 70 (FIG. 5) is secured on the outer end of crank shaft 35, spaced sufficiently from frame member 11 to accommodate a cooperating pawl 71 (FIG. 1). Pawl 71 and an arm 72 are secured on the respective ends of a sleeve 73 pivotally mounted on a stud 74 supported on frame member 11, with the pawl in the rotational plane of the sector 70. Normally pawl 71 is resiliently maintained in an inactive position shown in FIGS. 5 and 7, by means of a spring 75 secured at its one end on the free end of arm 72 and at its other end on a stud on frame member 11.

In a conventional ratchet gear and pawl mechanism, considerable noise is coincident with the spring-urged contact of the pawl with the teeth of the ratchet gear, as the pawl passes over the teeth, during the rotation of the gear in a given direction. In order to eliminate this noise incident, an arcuate strip or segment 76 of a soft elastomeric material, preferably polyurethane, is secured by any suitable means, such as rivets 77, on the gear sector 70. The outside radius of the peripheral edge surface of the arcuate strip 76 is sufficiently greater than the outside radius of the gear sector to permit the pawl 71 to ride on the peripheral edge of the arcuate strip without contact with the teeth 78 of the sector, upon rotation of the sector in a predetermined direction, the difference in the radii of the sector 70 and the arcuate strip 76 being approximately .015 of an inch. The thickness of the pawl 71 is substantially equivalent to the combined thicknesses of the sector 70 and the arcuate strip 76.

As the crank 38 moves to the left in FIG. 1, against the urgency of the relatively strong spring 39, toothed sector 70 is rocked counterclockwise or clockwise, as seen in FIG. 5, and as the leading edge of the sector 70 contacts the pawl 71, the pawl is rocked counterclockwise (FIG. 5) against the influence of the relatively strong spring 75 and rides on the peripheral surface of the arcuate strip 76 as seen in FIG. 6. The sector 70 continues to be rocked clockwise by means of the crank 38 for the duration or completion of the printing phase of the machine cycle of operation. At this time, the toothed sector or ratchet gear 70 is in the fully clockwise rocked position shown in FIG. 7, out of contact with the pawl 71. Pawl 71 is then restored to its normally inactive position, under the influence of the spring 75. Immediately thereafter, the crank 38 and therefore toothed sector 70 are returned to the normally inactive position to complete the cycle of machine operation. During the return movement, the toothed sector 70 rocks counterclockwise (FIG. 7) to the position shown in FIG. 5 and, as the leading edge of the sector contacts the pawl 71, the pawl is rocked clockwise thereafter riding on the peripheral edge surface of the soft elastomeric strip 76, until crank 38 has completed its return movement. If, at any time, during the clockwise or counterclockwise rocking movement of the crank 38 and ratchet sector 70, a reversal in the direction of movement is attempted, the respective contact point 79 or 80 of the pawl 71, under the influence of spring 75, causes the soft elastomeric strip 76 to yield permitting the engagement of the contact point between adjacent teeth 78 of the toothed sector 70, as seen in FIG. 8. Thus, the sector is locked to prevent a further reverse movement.

What is claimed is:

1. An antibackup device for a drive mechanism comprising:
   a drive shaft,
   control means for imparting rotation to said drive shaft,
   a gear secured on said shaft and having an elastomeric element secured thereto, the peripheral surface of said element projecting beyond the teeth of said gear,
   a pawl rockable in either of two directions in the rotational plane of said gear and said elastomeric element and normally rocked by said elastomeric element out of engagement with the teeth of said gear during rotation of said drive shaft in one direction, said pawl having a thickness substantially equal to the combined thicknesses of said gear and said element,
   a resilient means effective to urge said pawl into contact with the peripheral surface of said elastomeric element and to cause said elastomeric element to yield to enable engagement of said pawl with the teeth of said gear upon reversal of direction of rotation of said drive shaft thereby preventing rotation of said drive shaft in the opposite direction.

2. A device of the character described in claim 1 wherein said elastomeric element is of polyurethane yieldable to the influence of said resilient means to enable said pawl to engage between adjacent teeth of said gear upon reversal of direction of rotation of said drive shaft during its rotation in said one direction.

3. An antibackup device for a drive mechanism comprising:
   a framework,
   a drive shaft supported in said framework,
   a crank member for imparting a predetermined angular rotation to said drive shaft in either direction,
   a gear means secured on said drive shaft rockable by said crank member,
   a pawl mounted on said framework rockable in either direction from a neutral position and in the rotational plane of said gear means,
   a pliant element secured on said gear means operable upon rocking of said gear means in either direction to effect rocking of said pawl in a counter direction and to normally maintain said pawl out of engagement with the teeth of said gear means, and
   a resilient means normally operative to maintain said pawl in the neutral position in either extreme position of said gear means, effective to bias said pawl into engagement with said pliant element during movement of said gear means in a given direction and to enable said pawl to cause said pliant element to yield upon reversal of movement of said gear means during movement thereof in a given direction whereby further reverse movement is prevented.

4. A device of the character described in claim 3 wherein said gear means is a toothed sector.

5. A device of the character described in claim 3 wherein said pliant element is an arcuate elastomeric segment having a radius of the order of about .015 of an inch greater than the radius of said gear means.

References Cited

UNITED STATES PATENTS

| | | | |
|---|---|---|---|
| 315,051 | 4/1885 | Miller | 74—575 XR |
| 2,133,469 | 10/1938 | Obergfell | 74—576 |
| 2,522,004 | 9/1950 | Weidenman | 74—576 XR |
| 2,577,199 | 12/1951 | Klopner | 74—17.5 |
| 2,828,647 | 4/1958 | Reinsch | 74—576 |
| 2,941,628 | 6/1960 | McCloskey | 74—576 XR |
| 3,327,543 | 6/1967 | Nirenberg | 74—17.5 |

FRED C. MATTERN, JR., *Primary Examiner.*

JAMES A. WONG, *Assistant Examiner.*

U.S. Cl. X.R.

74—17.5, 576, 577; 188—82.2, 82.7